US007125462B2

(12) United States Patent
Disteldorf

(10) Patent No.: US 7,125,462 B2
(45) Date of Patent: Oct. 24, 2006

(54) METHOD OF MAKING VEHICLE WINDSHIELD USING COATING MASK

(75) Inventor: Bernd Disteldorf, Mettlach (DE)

(73) Assignee: Centre Luxembourgeois de Recherches pour le Verre et al Ceramique S.A. (C.R.V.C.), Grand Duchy (LU)

( * ) Notice: Subject to any disclaimer, the term of this patent is extended or adjusted under 35 U.S.C. 154(b) by 286 days.

(21) Appl. No.: 10/173,678

(22) Filed: Jun. 18, 2002

(65) Prior Publication Data

US 2003/0232197 A1 Dec. 18, 2003

(51) Int. Cl.
B05D 5/00 (2006.01)
(52) U.S. Cl. .................... 156/101; 156/106; 156/109; 156/155; 65/60.1; 65/60.3; 427/163.1; 427/270; 427/271; 427/272; 427/273; 427/154; 427/287
(58) Field of Classification Search ................ 156/101, 156/106, 109, 155; 428/34, 426, 432–433; 65/60.1–60.8; 427/282, 163.1, 270–273, 427/154–155, 108–110, 287; 219/203; 296/84.1; 52/786.12
See application file for complete search history.

(56) References Cited

U.S. PATENT DOCUMENTS

| | | | | |
|---|---|---|---|---|
| 2,559,969 A | * | 7/1951 | Kennedy | 427/108 |
| 2,971,867 A | * | 2/1961 | Lytle | 428/189 |
| 2,995,461 A | * | 8/1961 | Boicey et al. | 427/108 |
| 3,485,664 A | * | 12/1969 | Ernsthausen et al. | 427/106 |
| 3,682,528 A | | 8/1972 | Apfel et al. | |
| 3,932,681 A | * | 1/1976 | Forker et al. | 427/282 |
| 4,267,000 A | * | 5/1981 | Dix et al. | 156/235 |
| 4,322,277 A | | 3/1982 | Opresko | |
| 4,477,486 A | * | 10/1984 | Boaz | 427/510 |
| 4,898,790 A | | 2/1990 | Finley | |
| 4,965,121 A | | 10/1990 | Young et al. | |
| 4,988,424 A | | 1/1991 | Woodward et al. | |
| 5,420,015 A | * | 5/1995 | Wuerch | 435/12 |
| 5,492,750 A | | 2/1996 | Shumaker, Jr. et al. | |
| 5,514,476 A | | 5/1996 | Hartig et al. | |
| 5,557,462 A | | 9/1996 | Hartig et al. | |
| 5,563,734 A | | 10/1996 | Wolfe et al. | |
| 5,713,986 A | | 2/1998 | Franz et al. | |
| 5,800,933 A | | 9/1998 | Hartig et al. | |

(Continued)

FOREIGN PATENT DOCUMENTS

DE 44 33 051 A1 4/1997

(Continued)

Primary Examiner—Jessica Rossi
(74) Attorney, Agent, or Firm—Nixon & Vanderhye P.C.

(57) ABSTRACT

A water soluble mask is formed on a substrate. Thereafter, a coating (e.g., low-E coating) is formed on the substrate in at least one select area over the mask and in at least one area where the mask is not provided. After the coating has been formed, water is used to remove the mask and a portion of the coating formed thereon in order to form a partially coated substrate. The technique may be used in applications such as in the making of vehicle windshields, or the like.

8 Claims, 4 Drawing Sheets

U.S. PATENT DOCUMENTS

| | | |
|---|---|---|
| 5,837,108 A | 11/1998 | Lingle et al. |
| 5,902,505 A * | 5/1999 | Finley .................. 219/547 |
| 5,935,702 A | 8/1999 | Macquart et al. |
| 6,014,872 A | 1/2000 | Hartig et al. |
| 6,032,576 A | 3/2000 | Collins |
| 6,159,350 A | 12/2000 | Yoshimura et al. |
| 6,261,398 B1 | 7/2001 | Costa |
| 6,264,804 B1 | 7/2001 | Lee et al. |
| 6,280,821 B1 | 8/2001 | Kadunce et al. |
| 6,325,902 B1 | 12/2001 | Shishido et al. |
| 6,352,754 B1 | 3/2002 | Frost et al. |
| 6,356,236 B1 | 3/2002 | Maeuser et al. |
| 6,444,293 B1 | 9/2002 | Gregory et al. |

FOREIGN PATENT DOCUMENTS

| | | |
|---|---|---|
| WO | WO 01/66482 | 9/2001 |
| WO | WO 01/66483 | 9/2001 |
| WO | WO 02/04375 | 1/2002 |

* cited by examiner

METHOD OF MAKING VEHICLE WINDSHIELD USING COATING MASK

This invention relates to a method of making a coated article on which only part of a substrate surface ends up being coated with a desired coating. Certain example embodiments of this invention may relate to a method of making a vehicle windshield wherein a mask (e.g., ceramic paste) is printed (e.g., silk-screen printed) on a glass substrate in areas where a coating (e.g., low-E coating) is not desired, and thereafter the coating is formed on the substrate including in areas over the mask. After the coating has been formed, the mask is removed along with the coating portion(s) formed thereon.

BACKGROUND OF THE INVENTION

Vehicle windshields typically include first and second glass substrates that are laminated to one another via at least a polymer interlayer (e.g., PVB). A low emissivity (low-E) coating is often formed on an interior surface of one of the substrates so that the coating is provided between the substrates and adjacent the polymer interlayer in the final windshield product. A low-E coating typically includes at least one infrared (IR) reflecting layer such as Ag, NiCr, or Au, that is provided between at least a pair of dielectric layers. Example dielectric layers include silicon nitride, tin oxide, zinc oxide, etc. Example low-E coatings are disclosed in U.S. Pat. Nos. 3,682,528; 4,898,790; 4,965,121; 5,514, 476; 5,563,734; 5,800,933; 5,837,108; 5,557,462; 5,935, 702; and 6,014,872; and U.S. Ser. No. 09/794,224 (same as WO 02/04375), the disclosures of which are all hereby incorporated herein by reference. Other example low-E coatings are disclosed in WO 01/66483 and WO 01/66482. Such low-E coatings are provided so that the windshield can block (i.e., reflect and/or absorb) significant amounts of IR radiation thereby preventing the same from reaching the vehicle interior.

However, it is often preferred that some areas of the coated glass substrate not be provided with the low-E coating. For example, it may be desired that the coating (e.g., low-E coating) not be provided in toll area(s) of the windshield, rain sensor area(s) of the windshield, and/or adjacent edge(s) of the windshield. Regarding toll areas of the windshield (e.g., used for toll sensors and/or garage door openers), the IR reflecting layer(s) of the low-E coating may tend to interfere with electromagnetic wave transmissions (e.g., RF) associated therewith thereby rendering the coating undesirable in such areas. The same applies to rain sensor area(s). Low-E coatings are also sometimes not desired immediately adjacent edges of a windshield in order to avoid corrosion. Thus, it is known to remove the low-E coating from select area(s) (e.g., toll window area, rain sensor area, and/or edge area) of the coated substrate after the coating has been formed, but prior to lamination.

Low-E coatings are typically removed from such area(s) of a glass substrate by using a grinding wheel, sandblasting, or the like. Unfortunately, the use of a grinding wheel for removing low-E coating portions from a glass substrate can lead to scratching of the underlying substrate. This is undesirable; especially in viewing areas of a windshield. Cycle time may also be lost if many area(s) of the coating have to be deleted.

U.S. Pat. No. 5,713,986 discloses another technique for removing a low-E coating from select area(s) of a glass sheet. In the '986 patent, a resist is printed on a select area of a glass substrate prior to sputtering. After the resist has been formed and dried, a low-E coating is sputtered onto the substrate including in the select area over the resist. After formation of the coating, the resist along with the coating portion formed thereon is removed thereby deleting/removing the coating from the select area of the substrate. The result is a substrate that is coated with the low-E coating, but where the coating has been removed from the substrate in only the select area. In order to remove the resist (and the coating portion thereon), the '986 patent states that the coated substrate is soaked in hot water, and thereafter requires that hot water under high pressure at a temperature of at least 77 degrees C. (more preferably at least 85 degrees C.) is sprayed onto the substrate in order to remove the resist and the coating portion thereon.

Unfortunately, the technique of the '986 patent is undesirable because (a) it requires water at a very high temperature of at least 77 degrees C. to remove the resist, and/or (b) the materials used for the resist are collectively undesirable. For example, the high temperatures needed for removal are not desired, as they increase production costs and/or burdens.

In view of the above, it will be appreciated that there exists a need in the art for an improved technique for removing a coating portion from select area(s) of a coated substrate (e.g., in the manufacture of a vehicle windshield).

BRIEF SUMMARY OF THE INVENTION

An object of this invention is to provide an improved technique for removing a coating portion from select area(s) of a coated substrate.

In certain example embodiments of this invention, one or more of the above-listed needs and/or objects is/are fulfilled by providing a water soluble sputtering mask for preventing a portion of a sputtered coating from directly contacting a substrate on which the sputtering mask is provided, the water soluble sputtering mask comprising: an organic portion and a ceramic portion, and wherein the organic:ceramic ratio of the respective portions by weight is from about 3:1 to 1:1 when the water soluble sputtering mask is initially deposited onto the substrate. In certain example embodiments, at the time when the mask is initially deposited on the substrate, the organic portion makes up by weight from about 60 to 70% of the mask and the ceramic portion makes up by weight from about 30 to 40% of the mask.

In certain other example embodiments of this invention, one or more of the above-listed objects and/or needs is/are fulfilled by providing a method of making a vehicle windshield, the method comprising: providing a glass substrate; silkscreen printing a water soluble ceramic paste mask onto at least one select area of the substrate, the water soluble ceramic paste mask comprising an organic portion and a ceramic portion wherein the organic:ceramic ratio of the portions by weight is from about 3:1 to 1:1 when the ceramic paste mask is silk-screen printed onto the substrate; drying the water soluble ceramic paste mask; after drying the water soluble ceramic paste mask, sputtering a multi-layer coating onto the substrate so that the coating is provided over the mask in the at least one select area where the mask is provided and directly on the substrate in an area where the mask is not provided; removing the mask and a portion of the coating provided thereon from the select area of the substrate, but not from the area of the substrate where the mask was not provided, using at least water at a temperature of no greater than 60 degrees C. thereby forming a partially coated substrate; and laminating the partially coated substrate to another substrate in forming the vehicle windshield.

In certain other example embodiments of this invention, one or more of the above-listed objects and/or needs is/are fulfilled by providing a method of making a coated article, the method comprising: providing a substrate; forming a water soluble ceramic paste mask on at least one select area of the substrate, the water soluble ceramic paste mask comprising an organic portion and a ceramic portion wherein the organic:ceramic ratio of the portions by weight is from about 3:1 to 1:1 when the ceramic paste mask is initially deposited onto the substrate; after forming the mask, forming a coating on the substrate so that the coating is provided over the mask in the at least one select area where the mask is provided and the coating is provided directly on the substrate in an area where the mask is not provided; and removing the mask and a portion of the coating provided thereon from the select area of the substrate, but not from the area of the substrate where the mask was not provided, using at least water thereby forming a coated article including a partially coated substrate.

DETAILED DESCRIPTION OF THE INVENTION

Certain embodiments of this invention relate to a method of making a coated article (e.g., vehicle windshield, other type of vehicle window, architectural window, or the like) wherein a substrate is coated with a solar control coating (e.g., low-E coating). After being deposited, the solar control coating is removed from only select area(s) of the substrate thereby providing a coated article that is not entirely coated. The embodiment of this invention described below is in the context of making a vehicle windshield; however this embodiment is provided for purposes of example only and is not intended to be limiting unless claimed.

Figure 1:
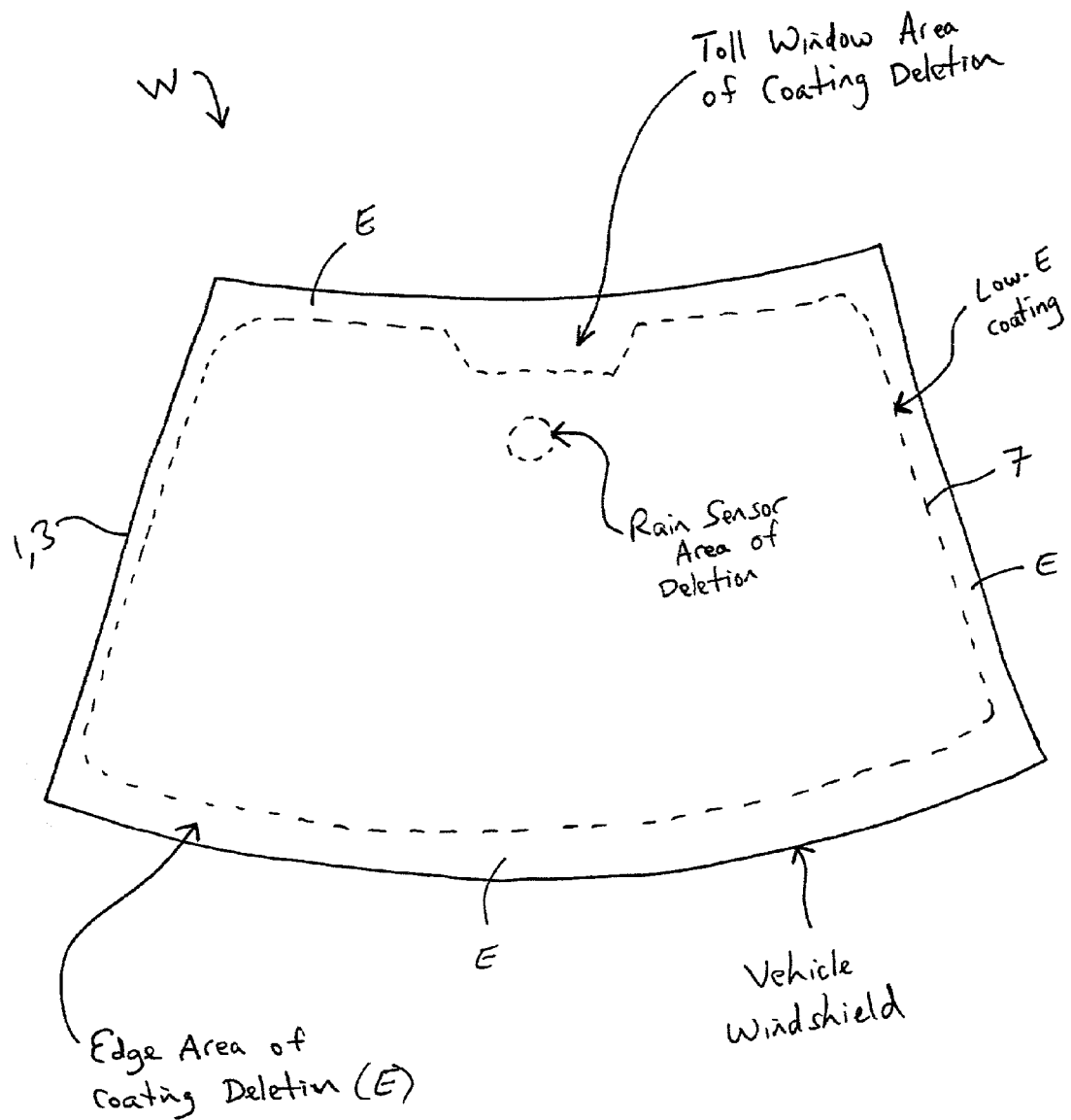
FIG. 1 is a plan view of a vehicle windshield made according to an example embodiment of this invention.
Figure 6:
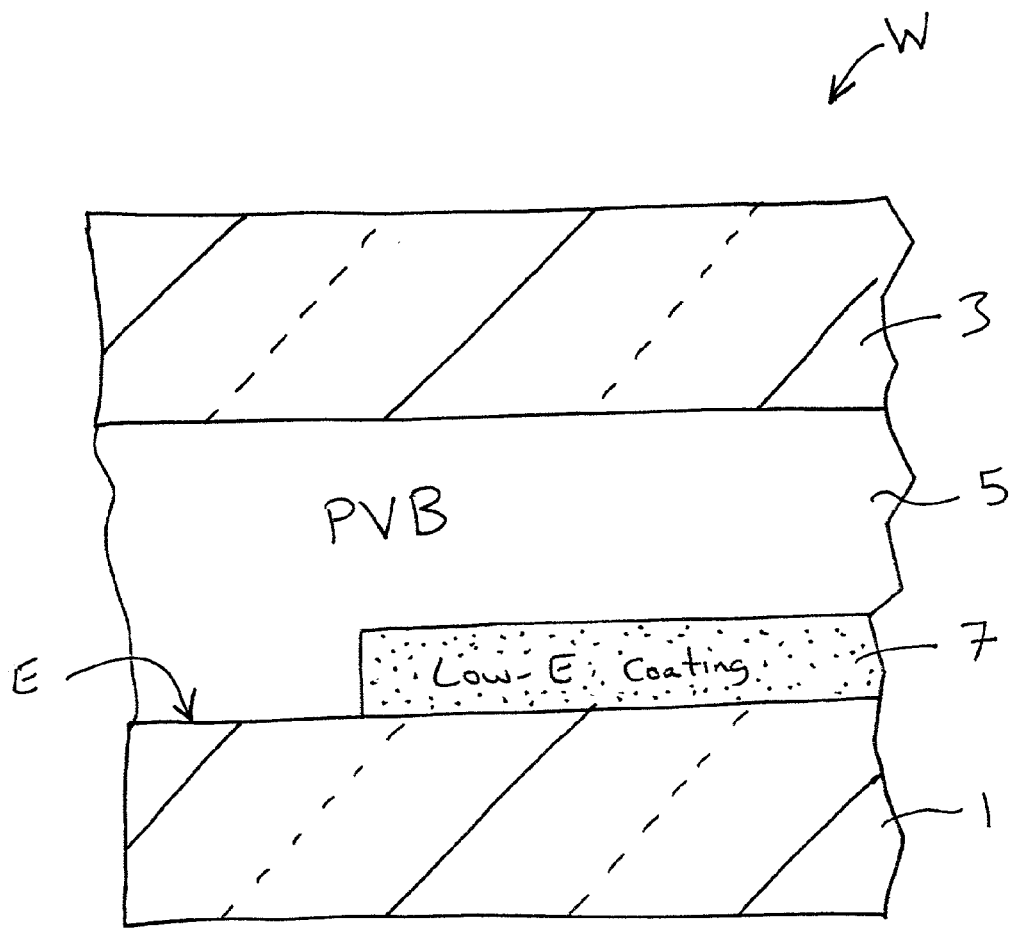
FIG. 6 is a cross sectional view of an edge part of the windshield according to the FIG. 1–5 embodiment of this invention.

A vehicle windshield W according to an example non-limiting embodiment of this invention is shown in FIGS. 1 and 6. The windshield W of FIGS. 1 and 6 includes first and second substrates (e.g., glass or plastic substrates) 1 and 3 that are laminated to one another via polymer based interlayer 5. The polymer based interlayer 5 may be of or include any suitable material, including but not limited to polyvinyl butyral (PVB), polyethylene, ethylene vinylacetate copolymer (EVA), or the like. A solar control coating (e.g., low-E coating) 7 is provided on the interior surface of substrate 1, but is not provided across the entire surface of the substrate. The dotted lines shown in FIG. 1 illustrate areas where the coating 7 has been deleted/removed. In this particular embodiment, the coating 7 has been removed from a rain sensor area, a toll window area, and around edges of the windshield in edge area(s) E. For example, due to the removal of the coating 7 from the toll window area, an optically and/or electromagnetic sensitive device(s) (e.g., garage door opener, radar receiver/transmitter, toll device, etc.) can transmit and/or receive energy through the toll window area of the windshield without significant interference from the IR reflecting layer(s) of the coating 7.

Figure 7:
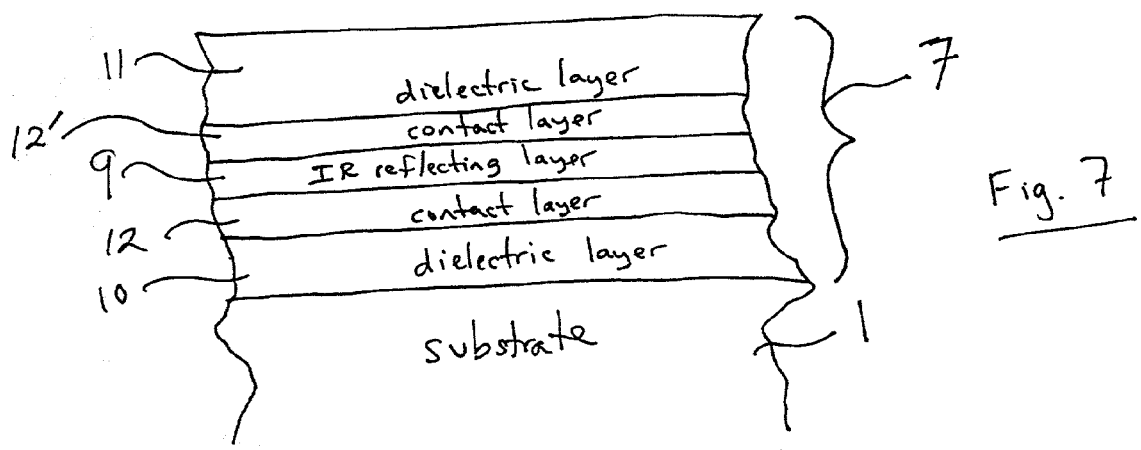
FIG. 7 is a cross sectional view of an example low-E coating that may be used in the FIGS. 1–6 embodiment.

Coating 7 may be any suitable solar control (e.g., low-E) type of coating. A low-E coating (and a solar control coating) typically includes at least one IR reflecting layer sandwiched between at least first and second dielectric layers. For example, see the example low-E coating shown in FIG. 7. The coating 7 of FIG. 7 includes IR reflecting layer 9 (e.g., of or including Ag, NiCr, Au, or the like) sandwiched between first and second dielectric layers 10 and 11. Dielectric layer(s) 10, 11 may be of or include any suitable dielectric material, including but not limited to silicon nitride, silicon oxide, zinc oxide, tin oxide, combinations thereof, or the like. Contact layer(s) 12 and 12' may also be provided immediately adjacent opposite sides of the IR reflecting layer 9. Contact layer(s) 12, 12' may be of or include any suitable material, including but not limited to NiCr, NiCrO$_x$, another metal oxide, a metal nitride, or the like. The layer stack shown in FIG. 7 may be repeated twice (one on top of the other) or more on substrate 1 in certain embodiments. Example but non-limiting low-E coatings 7, which may be used in certain example embodiments of this invention, are disclosed in U.S. Pat. Nos. 3,682,528; 4,898, 790; 4,965,121; 5,514,476; 5,563,734; 5,800,933; 5,837, 108; 5,557,462; 5,935,702; and 6,014,872; and U.S. Ser. No. 09/794,224 (same as WO 02/04375), the disclosures of which are all incorporated herein by reference. Other example low-E coatings which may be used are disclosed in WO 01/66483 and WO 01/66482.

In certain example embodiments, low-E coating 7 has a sheet resistance ($R_s$) of less than about 50 ohms/square, more preferably less than about 20 ohms/square, even more preferably less than 10 ohms/square, and most preferably less than 6 ohms/square (before and/or after heat treatment such as tempering of the underlying substrate 1). Other solar control coatings 7 (which need not have low emissivity) with at least one IR reflective layer and/or at least one UV blocking layer may instead be used, as the instant invention is not limited to the coatings listed above and/or herein.

Referring to FIGS. 1–6, set forth below is an example process of making the vehicle windshield of FIG. 1 according to an example embodiment of this invention.

A glass substrate 1 is first provided. The glass substrate may or may not be cut to the appropriate windshield size at this point in the process. The glass substrate 1 is washed and/or dried (see step 101 in FIG. 2). Prior to sputter coating, a ceramic paste mask 14 is formed (e.g., via silk-screen printing) on select area(s) of the substrate 1 as shown in FIG. 3 (see step 102 in FIG. 2). The select area(s) of the substrate 1 on which the ceramic paste mask 14 is formed may correspond to, for example and without limitation, one or more of what is to be a toll window area, a rain sensor area, and/or an edge area E of an ultimate windshield. The purpose of removable ceramic paste mask 14 is to cover select area(s) of the substrate where the coating will ultimately be removed, thereby preventing the coating (to be applied subsequently) from contacting and bonding to the substrate at these select area(s). The paste 14 may be formed on substrate 1 in any suitable manner, including but not limited to silk-screen printing. When silk-screen printing is used, a screen mesh of from 70 to 85 may be used (e.g., 77 mesh). In other embodiments, the paste 14 may be applied via roller(s), brush(es), via a robot, and/or the like.

Ceramic paste 14 is applied to the select area(s) of the substrate in liquid (including slurry) form. The ceramic paste 14 includes both a ceramic portion and an organic portion. A non-limiting example of the ceramic portion of paste 14 is Kaolin, which comprises a ball clay (natural material, mix between quartz and feldspar). A non-limiting example of the organic portion of paste 14 is WB65 (a mix between at least ethylen and propylenoxyd plus synthetic resin) and/or KD 2926 (a mix between at least different organic expectorants—solvent) available from Zschimmer & Schwarz (a German company located in Germany). Both of these example materials (WB65 and KD 2926) are water soluble.

When applied, ceramic paste 14 may in certain example embodiments have a weight (at the time when silk-screening or other application begins) of from about 800 to 2,000 gm/liter, more preferably from about 1,100 to 1,650 gm/liter, and even more preferably from about 1,300 to 1,550 gm/liter. In one example, the paste 14 when applied had a weight of about 1,450 gm/liter during the print phase. It has been found that, given the materials of the ceramic paste, these weights are particularly adapted to the silk-screening process and provide good results with respect thereto. Moreover, the paste 14 when applied (e.g., via silk-screen printing) to substrate 1 may have an organic:ceramic ratio by weight (e.g., ratio of WB65: Kaolin) of from about 3:1 to 1:1, more preferably about 2:1. The paste 14 when applied may comprise (wt. %) from about 40% to 85% organic medium, more preferably from about 50% to 75% organic medium, and even more preferably from about 60% to 70% organic medium. The paste 14 when applied may comprise from about 15% to 60% ceramic (e.g., Kaolin), more preferably from about 25% to 50% ceramic, and even more preferably from about 30% to 40% ceramic. Other materials may or may not be present in the paste in different embodiments of this invention. Paste 14 is applied to the substrate 1 at a thickness of from about 1 to 50 μm in certain example embodiments of this invention, more preferably at a thickness of from about 5 to 35 μm, and most preferably at a thickness of from about 15 to 25 (e.g., 20) μm, although other thicknesses may be used in alternative embodiments.

Figure 2:
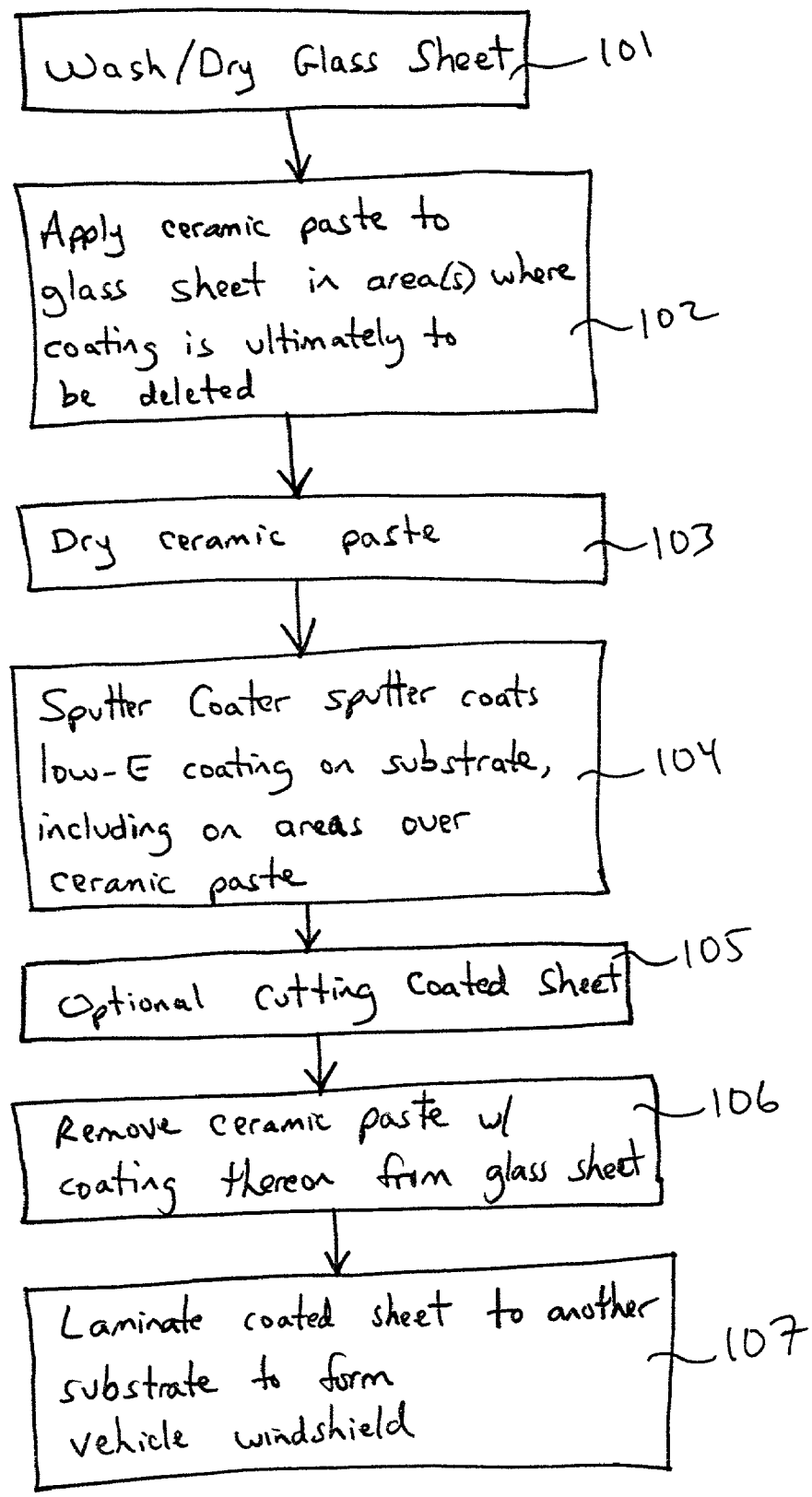
FIG. 2 is a flowchart illustrating certain steps carried out during the manufacture of the vehicle windshield of FIG. 1.
Figure 3:
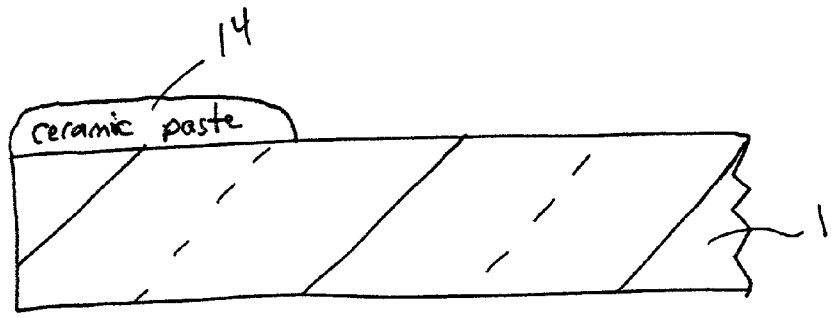
FIGS. 3–5 are cross sectional views of a substrate as it is processed through coating and deletion according to the FIGS. 1–2 embodiment of this invention.
Figure 4:
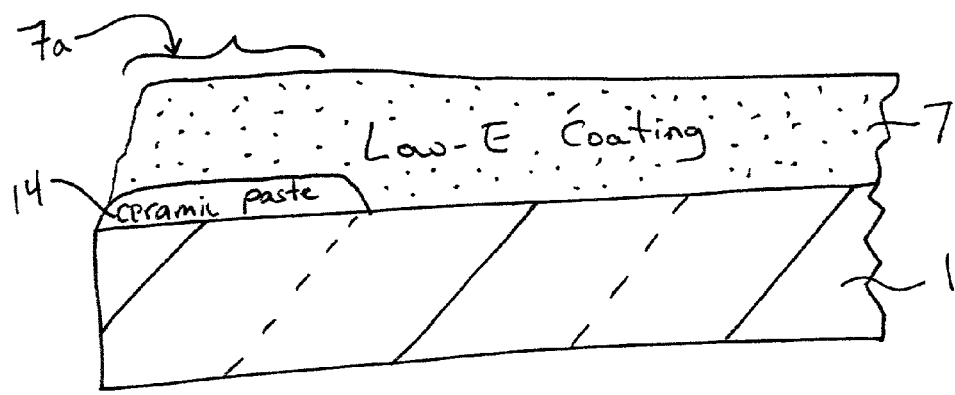

After the ceramic paste mask 14 has been applied to the substrate 1 on select area(s) thereof, the paste is dried (see step 103 in FIG. 2). In certain example embodiments, the paste may be dried by providing the coated substrate in a drier (e.g., temperature of from about 70–200 degrees C., more preferably from 80–120 degrees C., and even more preferably from about 90–110 degrees C.) for 0.5 to 30 seconds (more preferably from 1 to 10 seconds). After the paste mask 14 has been dried, thereby transforming it to a solid or more solid state, the substrate 1 with dried mask 14 thereon is passed through a sputter coating apparatus which sputters a multi-layer low-E coating 7 onto the entire substrate, including onto areas over the mask 14 as shown in FIG. 4 (see step 104 in FIG. 2). In certain embodiments, a printing station (e.g., silk-screening station) and a drying station (e.g., including a convection heater) may be provided in-line with and prior to the sputter coater so that the above-steps can be performed in an in-line process. Optionally, the coated substrate may be cut to appropriate size either at this point in the process, or at some other appropriate point in the manufacturing process (see step 105 in FIG. 2).

Figure 5:
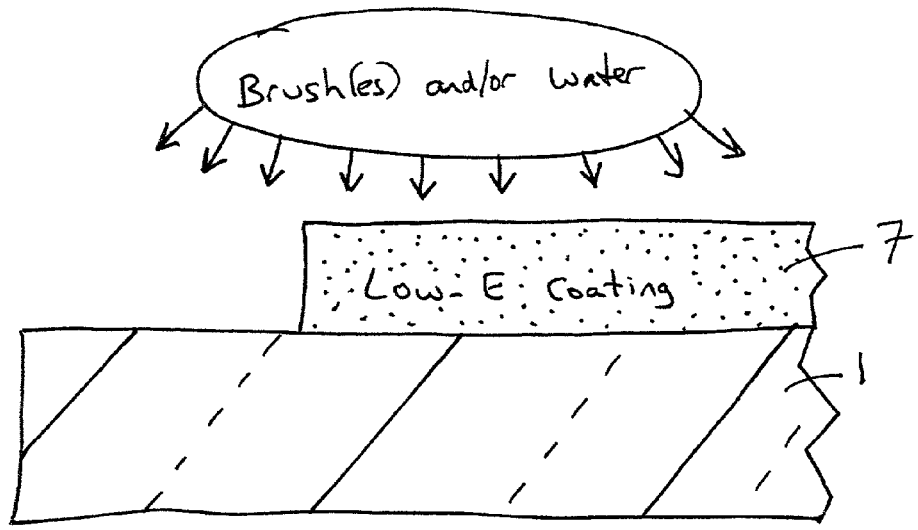

After the coating 7 has been sputtered onto the substrate, it is time to remove the mask 14 which in turn causes the coating portion 7a formed on the mask 14 to also be removed from the substrate. Because of the materials discussed above which make up the mask 14, it is water soluble. Moreover, extremely high water temperatures are not needed to remove the mask 14 (and the coating portion 7a thereon). This enables the mask 14 and coating portion 7a thereon to be removed using a conventional line washer with brushes as shown in FIG. 5 (see step 106 in FIG. 2). For example, in removing the mask 14 and coating portion 7a thereon, the line washer may use water at a temperature of from room temperature up to about 60 degrees C., more preferably from about 20 to 50 degrees C., and most preferably from about 20 to 40 degrees C. This is a significant advantage over the technique of U.S. Pat. No. 5,713,986 which requires much higher water temperatures for removal of the resist. When mask 14 and coating portion 7a are removed, the water used by the line washer may or may not be under pressure in different embodiments of this invention. Water alone may be used in removing the mask 14 and coating portion 7a thereon in certain embodiments, while in other embodiments soap and/or any other suitable element may be used in combination with the water during the removing of the mask 14 and coating portion 7a.

Following step 106 in FIG. 2, and as shown in FIG. 5, substrate 1 supports solar control coating 7. However, the coating portion(s) 7a have been removed from the substrate in the select area(s) where the mask 14 was formed and removed. Thus, the substrate 1 at this point is only partially coated with coating 7. In windshield embodiments, the majority of substrate 1 is coated with coating 7 at this point, with the coating portion(s) 7a and mask 14 having been removed in select areas such as around the edge(s) of the substrate 1 in area(s) E, in what is to be a rain sensor area, and/or in what is to be a toll window area.

Optionally, at least a portion of the edge area(s) E adjacent the periphery of the coated glass sheet may be painted, for example, with a black enamel and/or frit-like paint. This black (or other opaque color) paint may be formed on the same side of the substrate as the coating 7, or alternatively may be formed on a major surface of substrate 1 opposite the surface on which the coating 7 is formed. In another alternative embodiment, this black paint may be formed on the other substrate 3 in an edge area thereof. This opaque paint has the effect of masking the peripheral area of the windshield in certain instances.

Thereafter, in order to make the windshield W, the coated substrate 1 is laminated to another substrate (e.g., glass or plastic substrate) 3 via polymer based interlayer 5 as shown in FIGS. 1 and 6 (see step 107 in FIG. 2). After a polymer based weather seal and/or the like (not shown) has been applied to at least one edge of the windshield W, the windshield may be installed in a vehicle. The resulting windshield W may have a visible transmission of at least 70%, and in some instances at least 75%.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example and without limitation, the ceramic paste mask discussed above may be used in order to enable coating portions to be deleted in the context of architectural windows, vehicle windows other than windshields, and/or the like.

The invention claimed is:

1. A method of making a vehicle windshield, the method comprising:

providing a glass substrate;

silk-screen printing a water soluble ceramic paste mask onto at least one select area of the glass substrate in liquid and/or slurry form, the water soluble ceramic paste mask comprising an organic portion and a ceramic portion wherein an organic:ceramic ratio of the respective portions by weight is from about 3:1 to 1:1 when the ceramic paste mask is initially silk-screen printed onto the substrate, wherein the organic portion comprises a synthetic resin and propylenoxyd;

drying the water soluble ceramic paste mask when the mask is on the glass substrate;

after drying the water soluble ceramic paste mask on the glass substrate, sputtering a multi-layer low-E coating onto the substrate so that the low-E coating is provided over the mask in the at least one select area where the mask is provided and directly on the substrate in an area where the mask is not provided;

removing the mask and a portion of the low-E coating provided thereon from the select area of the substrate, but not from the area of the substrate where the mask was not provided, using at least water at a temperature of no greater than 60 degrees C. thereby forming a partially coated substrate; and laminating the partially coated substrate to another substrate in forming the vehicle windshield.

2. The method of claim 1, wherein the removing is carried out using at least water at a temperature of from about 20 to 50 degrees C.

3. The method of claim 2, wherein the removing is carried out using at least water at a temperature of from about 20 to 40 degrees C.

4. The method of claim 1, wherein at the time when the water soluble ceramic paste mask is initially deposited on the substrate, the organic portion makes up by weight from about 50 to 75% of the ceramic paste mask and the ceramic portion makes up by weight from about 25 to 50% of the ceramic paste mask.

5. The method of claim 4, wherein at the time when the water soluble ceramic paste mask is initially deposited on the substrate, the organic portion makes up by weight from about 60 to 70% of the ceramic paste mask and the ceramic portion makes up by weight from about 30 to 40% of the ceramic paste mask.

6. The method of claim 1, wherein at a time when the silk-screening begins, the ceramic paste has a weight of from about 800 to 2,000 gm/liter.

7. The method of claim 6, wherein at the time when the silk-screening begins, the ceramic paste has a weight of from about 1,100 to 1,650 gm/liter.

8. The method of claim 7, wherein at the time when the silk-screening begins, the ceramic paste has a weight of from about 1,300 to 1,550 gm/liter.

* * * * *